United States Patent
Yu et al.

(10) Patent No.: US 9,436,625 B2
(45) Date of Patent: Sep. 6, 2016

(54) APPROACH FOR ALLOCATING VIRTUAL BANK MANAGERS WITHIN A DYNAMIC RANDOM ACCESS MEMORY (DRAM) CONTROLLER TO PHYSICAL BANKS WITHIN A DRAM

(75) Inventors: Shu-Yi Yu, Sunnyvale, CA (US); Ram Gummadi, San Jose, CA (US); John H. Edmondson, Arlington, MA (US)

(73) Assignee: NVIDIA Corporation, Santa Clara, CA (US)

(*) Notice: Subject to any disclaimer, the term of this patent is extended or adjusted under 35 U.S.C. 154(b) by 609 days.

(21) Appl. No.: 13/517,534

(22) Filed: Jun. 13, 2012

(65) Prior Publication Data

US 2013/0339592 A1 Dec. 19, 2013

(51) Int. Cl.
G06F 12/00 (2006.01)
G06F 13/16 (2006.01)
G06F 12/06 (2006.01)
G06F 12/10 (2016.01)
G06F 9/50 (2006.01)

(52) U.S. Cl.
CPC ....... G06F 13/1668 (2013.01); G06F 12/0653 (2013.01); *G06F 9/5077* (2013.01); *G06F 12/10* (2013.01); *G06F 12/109* (2013.01); *G06F 2212/1028* (2013.01); *Y02B 60/1225* (2013.01); *Y02B 60/1228* (2013.01)

(58) Field of Classification Search
CPC .... G06F 12/08; G06F 9/45558; G06F 12/10; G06F 12/1009; G06F 2212/7201; G06F 12/109; G06F 9/5077; G06F 13/1668; G06F 12/0653; G06F 2212/1028; Y02B 60/1225

USPC ................. 711/202, 204, 105, 203
See application file for complete search history.

(56) References Cited

U.S. PATENT DOCUMENTS

| | | | |
|---|---|---|---|
| 7,805,587 B1* | 9/2010 | Van Dyke et al. | 711/202 |
| 7,872,657 B1* | 1/2011 | Edmondson et al. | 345/544 |
| 2003/0014667 A1* | 1/2003 | Kolichtchak | 713/201 |
| 2010/0095075 A1* | 4/2010 | Ganesh et al. | 711/161 |
| 2010/0223432 A1* | 9/2010 | Eidus et al. | 711/148 |
| 2010/0274960 A1* | 10/2010 | Lee et al. | 711/106 |
| 2010/0275202 A1* | 10/2010 | Branson et al. | 718/1 |
| 2011/0289482 A1* | 11/2011 | Bentley | 717/125 |
| 2012/0210095 A1* | 8/2012 | Nellans et al. | 711/206 |
| 2013/0042237 A1* | 2/2013 | Cardona | G06F 12/0284 718/1 |

* cited by examiner

*Primary Examiner* — Hong Kim
(74) *Attorney, Agent, or Firm* — Artegis Law Group, LLP (57) ABSTRACT

Banks within a dynamic random access memory (DRAM) are managed with virtual bank managers. A DRAM controller receives a new memory access request to DRAM including a plurality of banks. If the request accesses a location in DRAM where no virtual bank manager includes parameters for the corresponding DRAM page, then a virtual bank manager is allocated to the physical bank associated with the DRAM page. The bank manager is initialized to include parameters needed by the DRAM controller to access the DRAM page. The memory access request is then processed using the parameters associated with the virtual bank manager. One advantage of the disclosed technique is that the banks of a DRAM module are controlled with fewer bank managers than in previous DRAM controller designs. As a result, less surface area on the DRAM controller circuit is dedicated to bank managers.

22 Claims, 5 Drawing Sheets

APPROACH FOR ALLOCATING VIRTUAL BANK MANAGERS WITHIN A DYNAMIC RANDOM ACCESS MEMORY (DRAM) CONTROLLER TO PHYSICAL BANKS WITHIN A DRAM

BACKGROUND OF THE INVENTION

1. Field of the Invention

The present invention generally relates to controlling access to dynamic random access memory (DRAM) and, more specifically, to an approach to virtual bank management in dynamic random access memory (DRAM) controllers.

2. Description of the Related Art

Dynamic random access memory (DRAM) is employed in a variety of computing devices such as personal computers, laptops, gaming consoles, and graphics processing units due to the relatively high density and low power requirements of DRAM memory as compared to other alternatives. One difficulty in using DRAM memory, however, is that DRAM memory typically is subject to a variety of timing constraints in order to ensure proper operation and retention of data stored in DRAM. For example, memory cells within DRAM are periodically refreshed. Failure to timely refresh DRAM memory results in loss of data. As a result, systems using DRAM include one or more DRAM bank managers to refresh DRAM memory cells and meet other timing requirements of DRAM. In such implementations, the main processing unit is not burdened with managing these DRAM timing constraints.

DRAM performance may be improved by sub-dividing the DRAM into multiple banks of memory, where each bank includes a portion of the memory cells within a DRAM module. In such configurations, banks of DRAM may accessed in an interleaved fashion, where an access to one bank of memory occurs simultaneously with an access to a second bank of memory, but the memory accesses are offset in time with respect to each other. Typically, each DRAM bank is managed by a separate bank manager that manages the bank-specific timing parameters for the corresponding DRAM bank. One disadvantage of this approach is that a greater quantity of banks in a DRAM module results in a correspondingly greater quantity of bank mangers in the DRAM controller. Further, as DRAM architectures have evolved, the number of banks in the DRAM memory has increased, and the number of bank managers in a typical DRAM controller have proportionately increased as well. As a result, a significant portion of the surface area on a DRAM controller integrated circuit is dedicated to bank managers.

In addition to these problems, DRAM access patterns in certain applications are such that only a small portion of the DRAM banks are actively read or written at any given time. During such times, the bank managers corresponding to the active banks of DRAM memory are utilized, but the remaining bank managers are idle. Consequently, a relatively large area within a DRAM controller integrated circuit is devoted to a function that is idle for significant portions of time.

As the foregoing illustrates, what is needed in the art is a technique that more efficiently utilizes bank managers within a DRAM controller.

SUMMARY OF THE INVENTION

One embodiment of the present invention sets forth a computer-implemented method for allocating virtual bank managers within a dynamic random access memory (DRAM) controller. The method includes receiving a memory access request directed to a DRAM comprising a plurality of physical banks; identifying a physical bank within the plurality of physical banks that is associated with the first memory access request; and; and determining whether a virtual bank manager within a plurality of virtual bank managers is available to be allocated to the physical bank. If the virtual bank manager is available, then the method further includes allocating the virtual bank manager to the physical bank; and associating the virtual bank manager with the memory access request. If the virtual bank manager is not available, then the method further includes waiting until the virtual bank manager is available for allocation; allocating the virtual bank manager to the physical bank; and associating the virtual bank manager with the memory access request.

Other embodiments include, without limitation, a subsystem that includes a DRAM controller configured to implement one or more aspects of the disclosed methods as well as a computing device configured to implement one or more aspects of the disclosed methods.

One advantage of the disclosed technique is that the banks of a DRAM module are controlled with fewer bank managers than in previous DRAM controller designs. As a result, less surface area on the DRAM controller circuit is dedicated to bank managers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
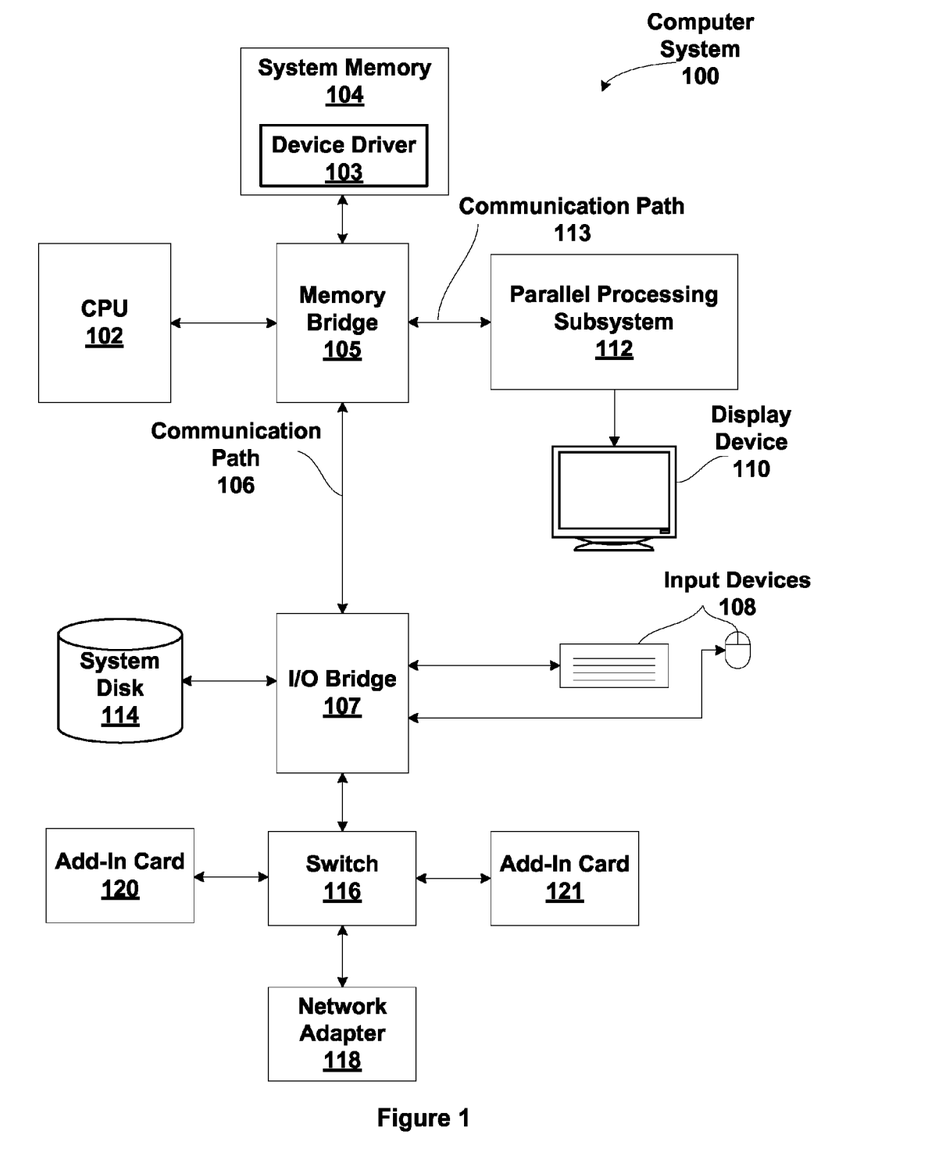
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
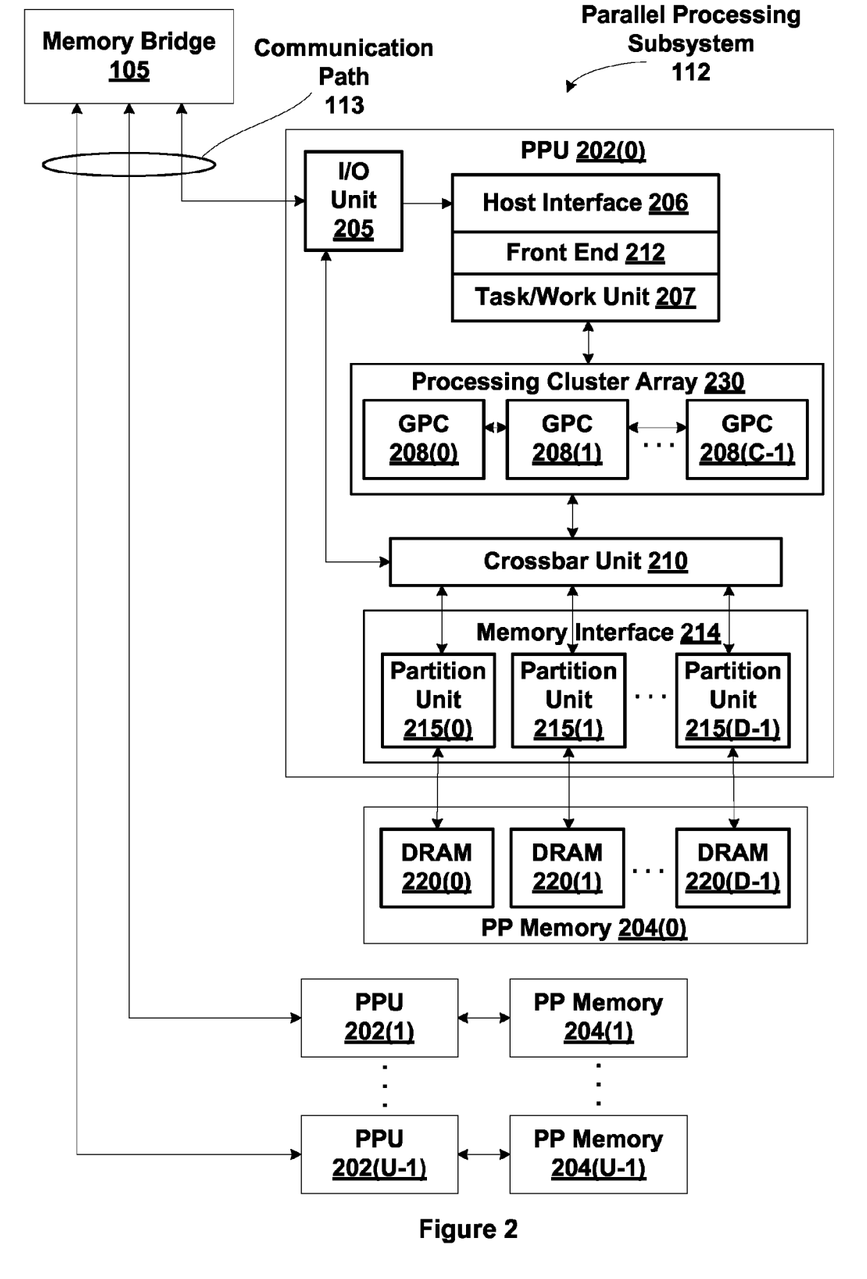
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Virtual DRAM Bank Management

Figure 3:
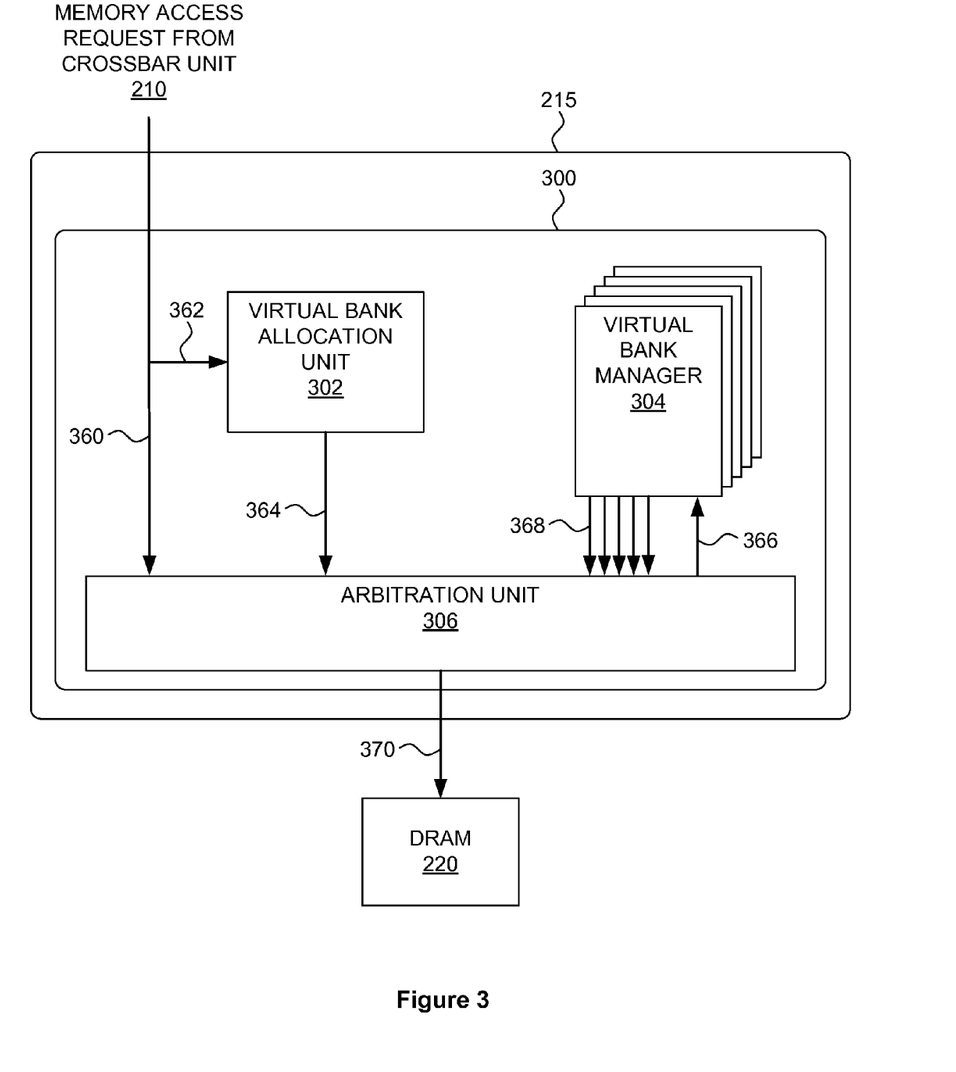
FIG. 3 illustrates a DRAM controller within a partition unit of FIG. 2, according to one embodiment of the invention.

FIG. 3 illustrates a DRAM controller 300 within a partition unit 215 of FIG. 2, according to one embodiment of the invention. As shown, the DRAM controller 300 includes, without limitation, a virtual bank allocation unit 302, one or more virtual bank managers 304, an arbitration unit 306, and DRAM 220.

The virtual bank allocation unit 302 assigns virtual bank managers 304 to physical banks associated with memory access requests. The virtual bank allocation unit 302 assigns virtual bank managers 304 dynamically as the memory access requests are received by the DRAM controller 300. Memory access requests are routed from one or more requesters and are received by the DRAM controller 300 via the crossbar unit 210. As discussed below, the memory access request is routed to the arbitration unit 306 via signal path 360. A portion of the memory access request includes an identifier that indentifies the physical bank to which the memory access request is directed. This physical bank identifier is transmitted to the virtual bank allocation unit 302 along signal path 362. The virtual bank allocation unit 302 determines whether at least one virtual bank manager 304 is available to be allocated to the physical bank associated with the memory access request.

If at least one virtual bank manager 304 is available, then the virtual bank allocation unit 302 selects one of the available virtual bank managers 304 and allocates the virtual bank manager 304 to the physical bank associated with the memory access request. In addition, the virtual bank allocation unit associates the memory access request with the virtual bank manager. The virtual bank allocation unit 302 then initializes the allocated virtual bank manager 304 with bank-specific timing parameters associated with the bank indicated by the physical bank identifier. Typically, the bank-specific timing parameters are determined from the device characteristics of the DRAM module, and may be retrieved from a storage area (not shown) associated with the DRAM controller 300. The virtual bank allocation unit 302 transmits the virtual bank number corresponding to the allocated virtual bank manager 304 to the arbitration unit 302 over signal path 364.

In some embodiments, if no virtual bank manager is available, then the virtual bank allocation unit may wait until a virtual bank manager 304 becomes available for allocation. For example, all virtual bank managers could be allocated to outstanding memory access requests. An allocated virtual bank manager 304 could be released after the associated memory access request has completed. Once released, the virtual bank manager could be allocated to a physical bank associated with another memory access request.

The virtual bank managers 304 store bank-specific timing parameters for an associated DRAM bank. These timing parameters include, without limitation, the row active time (denoted tRAS) specifying the number of clock cycles needed between a bank active command and issuing a precharge command, and the precharge time (denoted tRP) specifying the number of clock cycles needed between the issuing a precharge command and accessing the next row in memory. Each bank in DRAM 220 may have different timing constraints, represented by different values for the various timing parameters stored in the virtual bank managers 304. Initially, all virtual bank managers are inactive and available for allocation to a specific bank in DRAM 220. When a memory access request is received by the DRAM controller, the virtual bank allocation unit 302 determines whether at least one virtual bank manager 304 is available for allocation to the physical bank associated with the new memory access request. Once a memory access request satisfies the timing parameters for the corresponding DRAM bank, the timing constraints are transmitted by the virtual bank manager 304 to the arbitration unit 306 so that the memory access request may be completed.

The arbitration unit 306 receives memory access requests from one or more requestors and selects a memory access request for processing. The arbitration unit 306 receives memory access requests from the crossbar unit 210 along signal path 360. As discussed above, the virtual bank allocation unit 302 receives the physical bank number and subsequently transmits the corresponding virtual bank number to the arbitration unit 306 along signal path 364. The arbitration unit 306 selects a particular memory access request for servicing from among the outstanding memory access requests, using one or more arbitration techniques well understood in the art. After selecting a memory access request for processing, the arbitration unit transmits the virtual bank number to the virtual bank managers 304 along signal path 366. The selected virtual bank manager 304 responds with bank-specific timing parameters for the bank of DRAM 220 associated with the memory access request using signal path 368. The arbitration unit 306 then completes the memory access request by communicating to DRAM 220 along signal path 370.

As described above in conjunction with FIG. 2, DRAM 220 includes memory locations for storing data to be written or read by one or more requestors. The DRAM may be used for any purpose, including, without limitation, render targets, such as frame buffers or texture maps.

In some embodiments, the virtual bank allocation unit 302 may allocate a virtual bank manager 304 by setting a parameter within the virtual bank manager 304 where the parameter indicates whether the virtual bank manager 304 has been allocated to a physical bank associated with a memory access request. In such a case, the virtual bank allocation unit 302 may initialize the parameter for each virtual bank manager 304 to indicate that the virtual bank manger 304 is available for allocation. When the virtual bank allocation unit 302 allocates a virtual bank manager 304 to a physical bank associated with a memory access request, the virtual bank allocation unit 302 may set the parameter to indicate the virtual bank manager 304 is not available. When the corresponding memory access request completes, the virtual bank allocation unit 302 may release the virtual bank manager 304 by setting the parameter to indicate that the virtual bank manager 304 is again available for allocation.

In other embodiments, the virtual bank allocation unit 302 may allocate a virtual bank manager 304 via a data structure such as a free pool. In such a case, the virtual bank allocation unit 302 may initialize the free pool to indicate that all virtual bank managers 304 are available for allocation. When the virtual bank allocation unit 302 allocates a virtual bank manager 304 to a physical bank associated with a memory access request, the virtual bank allocation unit 302 may remove the entry in the free pool associated with the virtual bank manager 304 to indicate the virtual bank manager 304 is not available. When the corresponding memory access request completes, the virtual bank allocation unit 302 may release the virtual bank manager 304 by adding an entry to the free pool to indicate that the virtual bank manager 304 is again available for allocation.

In some embodiments, the virtual bank allocation unit 302 may determine that an active virtual bank manager 304 is allocated to the same physical bank as the physical bank associated with the current memory access request. In such a case, the virtual bank allocation unit 302 may associate the active virtual bank manager to the current memory access request rather than allocating a second bank manager 304 to the current request. In addition, the virtual bank allocation unit associates the current memory access request with the virtual bank manager. In such a case, the virtual bank allocation unit 302 may not release the active bank manager 304 until all associated memory access requests have completed.

In yet other embodiments, the virtual bank allocation unit 302 also may receive an identifier that identifies a particular page of memory in DRAM 220, where a page may include multiple memory locations, and a bank includes multiple pages. In such a case, at least some of the timing parameters included within the virtual bank manager 304 may be specific to the particular page within the bank of DRAM 220, while other parameters included within the virtual bank manager 304 may be applicable to all memory locations in the corresponding bank of DRAM 220. When a first virtual bank manager 304 includes parameters specific to a particular page within a bank of DRAM 220, the first virtual bank manager 304 may only be assigned to multiple memory access requests if the memory access requests are directed to the same page within the same block of DRAM 220. A memory access request directed to a different page within the same bank of DRAM 220 may be associated with a second virtual bank manager 304. In such a case, the second virtual bank manager 304 is allocated to the same physical bank as the first virtual manager, but includes timing parameters associated with a different page in the physical bank.

In at least one embodiment, the virtual bank manager 304 may be allocated and released at specific phases within a given memory access request. For example, the virtual bank manager 304 may be allocated to a physical bank associated with a memory access request at the time the bank in DRAM 220 is activated. In another example, the virtual bank manager may be released at the time the bank in DRAM 220 is precharged.

It should be recognized that the techniques described herein are sufficiently flexible to accommodate several variations. For example, although described in the context of a parallel processing subsystem (PPS) 112, the DRAM controller 300 could be deployed in any system that includes DRAM 220 managed by a DRAM controller 300. In another example, the DRAM controller could include any quantity of virtual bank managers 304 configured to manage any number of physical banks of DRAM 220. In yet another example, the DRAM controller 300 may be configured to receive memory requests from a single requestor or from any number of requestors. As such, the illustrations included in FIGS. 1-3 are to be considered exemplary and not limiting.

Figure 4:
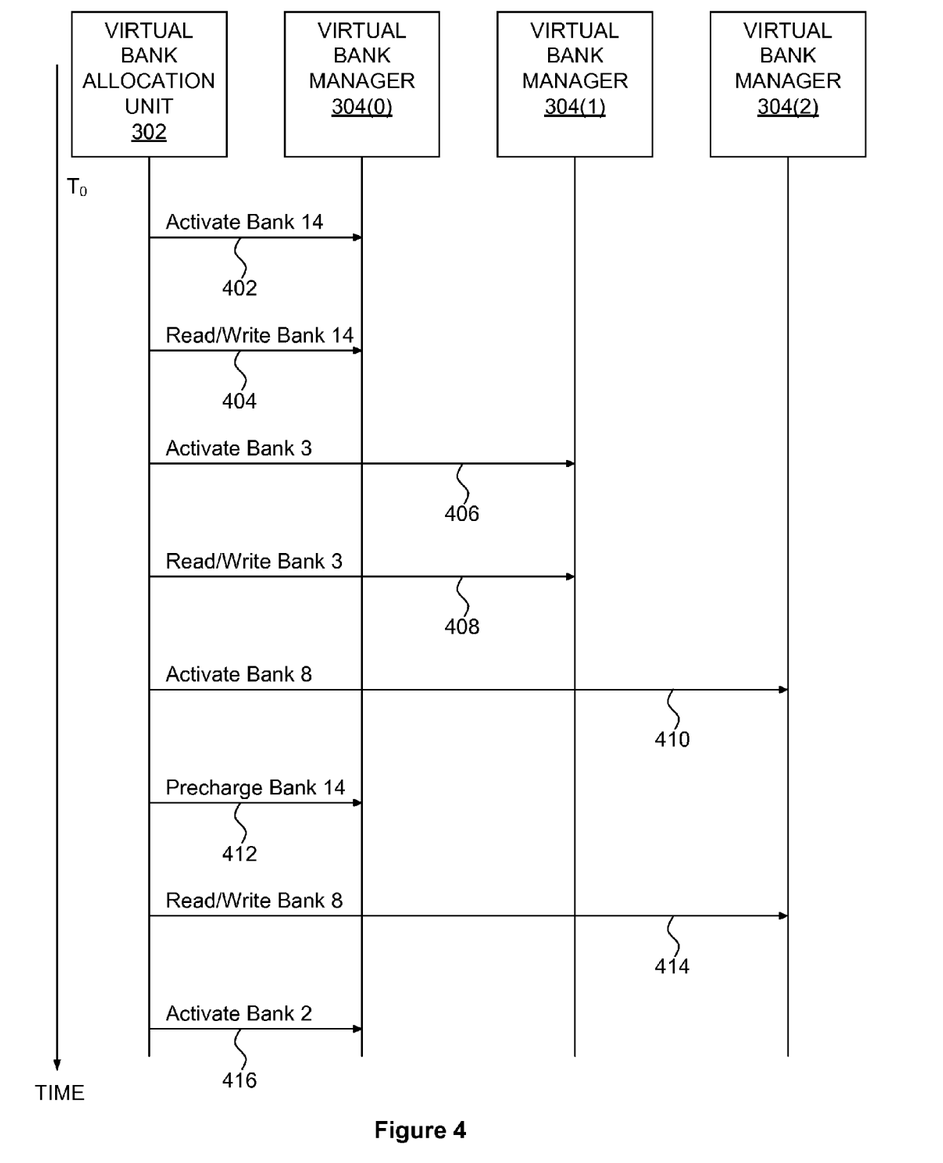
FIG. 4 illustrates a sequence of events that a virtual bank allocation unit within the DRAM controller of FIG. 3 follows when assigning virtual bank managers to banks of DRAM, according to an embodiment of the present invention.

FIG. 4 illustrates a sequence of events that a virtual bank allocation unit 302 within the DRAM controller 300 of FIG. 3 follows when assigning virtual bank managers 304 to banks of DRAM 220, according to an embodiment of the present invention.

The sequence of events begins at time $T_0$, where all virtual bank managers 304 are in the free pool and are available for allocation to physical banks associated with incoming memory access requests. At event 402, the DRAM controller 300 receives a request to activate physical bank 14. In response, the virtual bank allocation unit 302 allocates virtual bank manager 0 304(0) to physical bank 14. Virtual bank manager 0 304(0) is initialized with timing parameters associated with the memory access request directed to physical bank 14. At event 404, the DRAM controller 300 receives a request to read or write a memory location within physical bank 14. In response, the virtual bank allocation unit 302 retrieves timing parameters from virtual bank manager 0 304(0) needed to complete the read or write.

At event 406, the DRAM controller 300 receives a request to activate physical bank 3. In response, the virtual bank allocation unit 302 allocates virtual bank manager 1 304(1) to physical bank 3. Virtual bank manager 1 304(1) is initialized with timing parameters associated with the memory access request directed to physical bank 3. At event 408, the DRAM controller 300 receives a request to read or write a memory location within physical bank 3. In response, the virtual bank allocation unit 302 retrieves timing parameters from virtual bank manager 1 304(1) needed to complete the read or write.

At event 410, the DRAM controller 300 receives a request to activate physical bank 8. In response, the virtual bank allocation unit 302 allocates virtual bank manager 2 304(2) to physical bank 8. Virtual bank manager 2 304(2) is initialized with timing parameters associated with the memory access request directed to physical bank 8. At event 412, the DRAM controller 300 receives a request to precharge physical bank 14. In response, the virtual bank allocation unit 302 releases virtual bank manager 0 304(0) after the precharge time has been satisfied. Virtual bank manager 0 304(0) is now available for allocation to a physical bank associated with a new memory access request.

At event 414, the DRAM controller 300 receives a request to read or write a memory location within physical bank 8. In response, the virtual bank allocation unit 302 retrieves timing parameters from virtual bank manager 1 304(1) needed to complete the read or write. At event 416, the DRAM controller 300 receives a request to activate physical bank 2. In response, the virtual bank allocation unit 302 allocates virtual bank manager 0 304(0) to physical bank 2. Virtual bank manager 0 304(0) is initialized with timing parameters associated with the memory access request directed to physical bank 2.

Figure 5:
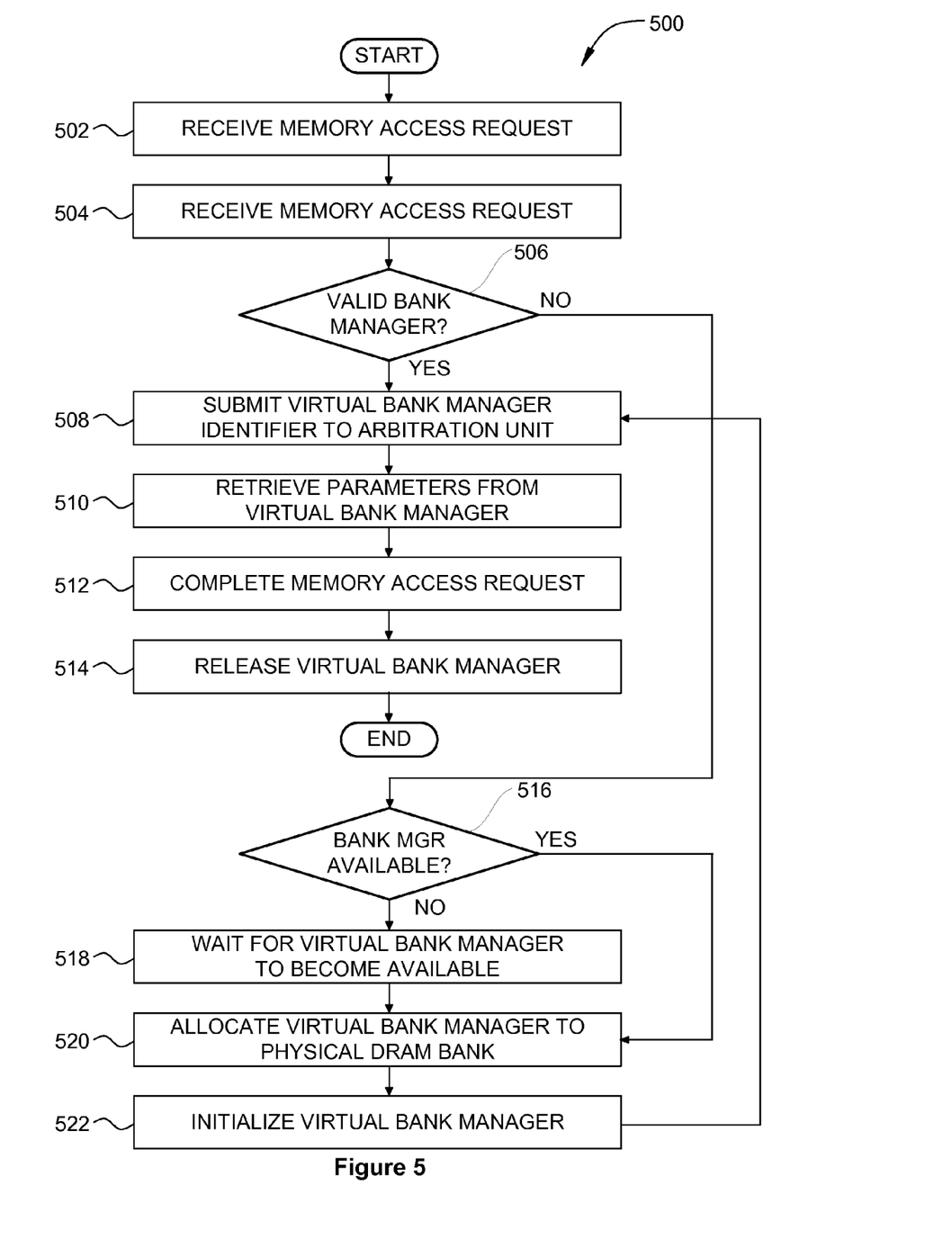
FIG. 5 is a flow diagram of method steps for dynamically allocating bank managers in a DRAM controller, according to one embodiment of the present invention.

FIG. 5 is a flow diagram of method steps for dynamically allocating bank managers in a DRAM controller 300, according to one embodiment of the present invention. Although the method steps are described in conjunction with FIGS. 1-3, persons skilled in the art will understand that any system configured to perform the method steps, in any order, falls within the scope of the present invention.

As shown, a method 500 begins at step 502, where the DRAM controller 300 receives a memory access request directed to a DRAM that includes a plurality of physical banks. At step 504, the DRAM controller 300 identifies a physical bank within the plurality of physical banks that is associated with the memory access request. At step 506, the DRAM controller 300 determines whether the memory access request is directed to a valid virtual bank manage 304, where a valid virtual bank manager 304 is already initialized with parameters for the physical bank associated with the memory access request, and the virtual bank manager is active. The DRAM controller 300 may also determine whether the virtual bank manager 304 is initialized with parameters for a specific memory page within the physical bank of DRAM 220. If the memory access request is directed to a valid virtual bank manager 304, then the method 500 proceeds to step 508, where the DRAM controller 300 submits to the arbitration unit 306, an identifier that identifies the virtual bank manager 304 associated with the memory access request. The DRAM controller 300 also associates the memory access request to the allocated virtual bank manager 304. At step 510, the DRAM controller 300 retrieves one or more parameters from the virtual bank manager 304 associated with the memory access request. At step 512, the DRAM controller completes the memory access request. At step 514, the DRAM controller 300 releases the virtual bank manager 304 associated with the memory access request. The method 500 then terminates.

If, at step 506, the memory access request is not directed to a valid virtual bank manager 304, then the method proceeds to step 516 where the DRAM controller 300 determines whether a virtual bank manager 304 is available for allocation to the physical bank associated with the memory access request. That is, the DRAM controller 300 determines whether at least one of the virtual bank managers 304 is not active, and, therefore, in the free pool. If at least one virtual bank manager 304 is available for allocation, then the method 500 proceeds to step 520, where the DRAM controller 300 allocates an available virtual bank manager 304 to the physical DRAM bank that includes the page accessed by the memory access request. The DRAM controller 300 also associates the memory access request to the allocated virtual bank manager 304. At step 522, the DRAM controller 300 initializes the allocated virtual bank manager 304 with various parameters associated with the physical DRAM bank, as described above in conjunction with FIG. 3. the DRAM controller 300 may also initialize the allocated virtual bank manager 304 with various parameters associated a specific memory page within the physical DRAM bank. The method 500 then proceeds to step 508, described above.

If, at step 516, the DRAM controller 300 determines that no virtual bank manager 304 is available, then the method proceeds to step 518, where the DRAM controller 300 waits for a virtual bank manager to be available for allocation. For example, a virtual bank manager could be released on the completion of a prior memory access request, and thus available for allocation. Once a virtual bank manager 304 is available for allocation, the method 500 proceeds to step 520, described above.

In sum, a technique is disclosed for managing DRAM banks with virtual bank managers. A DRAM controller receives a new memory access request to a DRAM including a plurality of banks. A virtual bank manager is allocated to the DRAM bank that includes the page and is initialized to include parameters needed by the DRAM controller to access the corresponding page in DRAM 220. The memory access request is then processed using the parameters associated with the virtual bank manager. Subsequent accesses to the same DRAM page may utilize the same virtual bank manager, so long as the virtual bank manager is still active for the given DRAM page. Once all virtual bank managers are active and allocated to physical banks, further DRAM memory access requests are placed in a waiting state pending the release of a virtual bank manager upon completion of another current memory access request. The DRAM controller then allocates the released bank manager and completes the new access request.

One advantage of the disclosed technique is that the banks of a DRAM module are controlled with fewer bank managers relative to previous DRAM controller designs. Power consumption of a DRAM controller is reduced where fewer bank managers are deployed. As a result, with fewer bank managers, less surface area on the DRAM controller circuit needs to be dedicated to bank managers.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. Therefore, the scope of embodiments of the present invention is set forth in the claims that follow.

What is claimed is:

1. A computer-implemented method for allocating virtual bank managers within a dynamic random access memory (DRAM) controller, the method comprising:
   receiving a first memory access request directed to a DRAM comprising a plurality of physical banks;
   identifying a first physical bank within the plurality of physical banks that is associated with the first memory access request;
   determining whether a first virtual bank manager included in a plurality of virtual bank managers that reside within the DRAM controller is available for allocation to the first physical bank;
   if the first virtual bank manager is available, then:
      allocating the first virtual bank manager to the first physical bank; and
      associating the first virtual bank manager with the first memory access request; or
   if the first virtual bank manager is not available, then:
      waiting until the first virtual bank manager is available for allocation;
      allocating the first virtual bank manager to the first physical bank; and
      associating the first virtual bank manager with the first memory access request.

2. The method of claim 1, further comprising:
   retrieving one or more parameters from the first virtual bank manager; and
   completing at least one phase of the first memory access request based on the one or more parameters.

3. The method of claim 1, further comprising:
   determining that the first memory access request has reached a final phase of execution; and
   releasing the first virtual bank manager such that the first virtual bank manager is available for allocation to a second memory access request.

4. The method of claim 3, further comprising:
   receiving a second memory access request directed to the first physical bank; and
   associating the first virtual bank manager with the second memory access request.

5. The method of claim 1, further comprising initializing the first virtual bank manager with one or more timing parameters associated with the first physical bank.

6. The method of claim 5, wherein the one or more timing parameters include at least one of a row active time and a pre-charge time.

7. The method of claim 1, further comprising initializing the first virtual bank manager with one or more timing parameters associated with a first memory page associated with the first physical bank.

8. The method of claim 7, further comprising:
   receiving a second memory access request directed to the first memory page associated with the first physical bank; and
   associating the first virtual bank manager with the second memory access request.

9. The method of claim 7, further comprising:
   receiving a second memory access request directed to a second memory page associated with the first physical bank;

determining whether a second virtual bank manager included in the plurality of virtual bank managers is available for allocation to the first physical bank;
if the second virtual bank manager is available, then:
allocating the second virtual bank manager to the first physical bank;
initializing the second virtual bank manager with one or more timing parameters associated with the second memory page associated with the first physical bank; and
associating the second virtual bank manager with the second memory access request; or
if the second virtual bank manager is not available, then:
waiting until the second virtual bank manager is available for allocation;
allocating the second virtual bank manager to the first physical bank;
initializing the second virtual bank manager with one or more timing parameters associated with the second memory page associated with the first physical bank; and
associating the second virtual bank manager with the second memory access request.

10. A dynamic random access memory (DRAM) controller, comprising:
an arbitration unit;
a plurality of virtual bank managers coupled to the arbitration unit; and
a virtual bank allocation unit that is coupled to the arbitration unit and configured to perform the steps of:
receiving a first memory access request directed to a DRAM comprising a plurality of physical banks;
identifying a first physical bank within the plurality of physical banks that is associated with the first memory access request;
determining whether a first virtual bank manager included in the plurality of virtual bank managers is available for allocation to the first physical bank;
if the first virtual bank manager is available, then:
allocating the first virtual bank manager to the first physical bank; and
associating the first virtual bank manager with the first memory access request; or
if the first virtual bank manager is not available, then:
waiting until the first virtual bank manager is available for allocation;
allocating the first virtual bank manager to the first physical bank; and
associating the first virtual bank manager with the first memory access request.

11. The DRAM controller of claim 10, wherein the virtual bank allocation unit is further configured to perform the steps of:
retrieving one or more parameters from the first virtual bank manager; and
completing at least one phase of the first memory access request based on the one or more parameters.

12. The DRAM controller of claim 10, wherein the virtual bank allocation unit is further configured to perform the steps of:
determining that the first memory access request has reached a final phase of execution; and
releasing the first virtual bank manager such that the first virtual bank manager is available for allocation to a second memory access request.

13. The DRAM controller of claim 10, wherein the virtual bank allocation unit is further configured to perform the steps of:
receiving a second memory access request directed to the first physical bank; and
associating the first virtual bank manager with the second memory access request.

14. The DRAM controller of claim 10, wherein the virtual bank allocation unit is further configured to perform the step of initializing the first virtual bank manager with one or more timing parameters associated with the first physical bank.

15. The DRAM controller of claim 10, wherein the virtual bank allocation unit is further configured to perform the step of initializing the first virtual bank manager with one or more timing parameters associated with a first memory page associated with the first physical bank.

16. The DRAM controller of claim 10, wherein the virtual bank allocation unit is further configured to perform the steps of:
receiving a second memory access request directed to the first memory page associated with the first physical bank; and
associating the first virtual bank manager with the second memory access request.

17. The DRAM controller of claim 9, wherein the virtual bank allocation unit is further configured to perform the steps of:
receiving a second memory access request directed to a second memory page associated with the first physical bank;
determining whether a second virtual bank manager included in the plurality of virtual bank managers is available for allocation to the first physical bank;
if the second virtual bank manager is available, then:
allocating the second virtual bank manager to the first physical bank;
initializing the second virtual bank manager with one or more timing parameters associated with the second memory page associated with the first physical bank; and
associating the second virtual bank manager with the second memory access request; or
if the second virtual bank manager is not available, then:
waiting until the second virtual bank manager is available for allocation;
allocating the second virtual bank manager to the first physical bank;
initializing the second virtual bank manager with one or more timing parameters associated with the second memory page associated with the first physical bank; and
associating the second virtual bank manager with the second memory access request.

18. A parallel processor, comprising:
a processing array; and
at least one partition unit coupled to the processing array and including a memory controller, the memory controller having:
an arbitration unit,
a plurality of virtual bank managers coupled to the arbitration unit, and
a virtual bank allocation unit is coupled to the arbitration unit and configured to perform the steps of:
receiving a first memory access request directed to a dynamic random access memory (DRAM) comprising a plurality of physical banks;

identifying a first physical bank within the plurality of physical banks that is associated with the first memory access request;
determining that a first virtual bank manager included in the plurality of virtual bank managers is available for allocation to the first physical bank;
allocating the first virtual bank manager to the first physical bank; and
associating the first virtual bank manager with the first memory access request.

19. The parallel processor of claim 18, wherein the virtual bank allocation unit is further configured to perform the step of initializing the first virtual bank manager with one or more timing parameters associated with a first memory page associated with the first physical bank.

20. The parallel processor of claim 18, wherein the virtual bank allocation unit is further configured to perform the steps of:
receiving a second memory access request directed to the first memory page associated with the first physical bank; and
associating the first virtual bank manager with the second memory access request.

21. The parallel processor of claim 18, wherein the virtual bank allocation unit is further configured to perform the steps of:
receiving a second memory access request directed to a second memory page associated with the first physical bank;
determining that a second virtual bank manager included in the plurality of virtual bank managers is available for allocation to the first physical bank;
allocating the second virtual bank manager to the first physical bank; and
associating the second virtual bank manager with the second memory access request.

22. The parallel processor of claim 21, wherein the virtual bank allocation unit is further configured to perform the step of initializing the second virtual bank manager with one or more timing parameters associated with the second memory page associated with the first physical bank.

* * * * *

UNITED STATES PATENT AND TRADEMARK OFFICE
CERTIFICATE OF CORRECTION

| | |
|---|---|
| PATENT NO. | : 9,436,625 B2 |
| APPLICATION NO. | : 13/517534 |
| DATED | : September 6, 2016 |
| INVENTOR(S) | : Shu-Yi Yu, Ram Gummadi and John H. Edmondson |

It is certified that error appears in the above-identified patent and that said Letters Patent is hereby corrected as shown below:

In the Claims

Column 14, Claim 18, Line 63, please insert --that-- after unit.

Signed and Sealed this
Thirty-first Day of January, 2017

Michelle K. Lee
*Director of the United States Patent and Trademark Office*